United States Patent
Kameyama

(10) Patent No.: US 10,840,836 B2
(45) Date of Patent: Nov. 17, 2020

(54) MOTOR CONTROL APPARATUS INCLUDING CURRENT DETECTION UNIT FOR DETECTING COIL CURRENT AND IMAGE FORMING APPARATUS

(71) Applicant: CANON KABUSHIKI KAISHA, Tokyo (JP)

(72) Inventor: Shigeru Kameyama, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/440,118

(22) Filed: Jun. 13, 2019

(65) Prior Publication Data

US 2019/0393812 A1 Dec. 26, 2019

(30) Foreign Application Priority Data

Jun. 20, 2018 (JP) .................. 2018-117310

(51) Int. Cl.
*H02P 6/28* (2016.01)
*H02P 6/18* (2016.01)
*H02P 6/24* (2006.01)

(52) U.S. Cl.
CPC .............. *H02P 6/186* (2013.01); *H02P 6/24* (2013.01); *H02P 6/28* (2016.02); *H02P 2203/03* (2013.01)

(58) Field of Classification Search
CPC .. H02P 6/16; H02P 6/186; H02P 6/182; H02P 6/28; H02P 21/18; H02M 7/53873; H02M 2001/0009
See application file for complete search history.

(56) References Cited

U.S. PATENT DOCUMENTS 5,493,188 A * 2/1996 Yoshikawa ............... H02P 6/24
318/400.09
7,423,403 B2 * 9/2008 Watanabe ........ H02M 7/53873
318/599

(Continued)

FOREIGN PATENT DOCUMENTS

JP H05-091780 A 4/1993
JP 2003-164197 A 6/2003

(Continued)

OTHER PUBLICATIONS

Copending, unpublished, U.S. Appl. No. 16/400,196 to Shigeru Kameyama, filed May 1, 2019.

*Primary Examiner* — Rina I Duda
(74) *Attorney, Agent, or Firm* — Venable LLP

(57) ABSTRACT

A motor control apparatus includes: a current detection unit configured to detect currents flowing through a plurality of coils of a motor, and includes a first detection unit that detects a current flowing through a first coil of the plurality of coils, and a second detection unit that detects a current flowing through a second coil of the plurality of coils; a determination unit configured to perform determination processing for determining a stopping position of a rotor of the motor based on a detection result of the current detection unit; and a calibration unit configured to calibrate the second detection unit based on a detection result of the first detection unit and a detection result of the second detection unit when a current is flowing in a series connection of the first coil and the second coil in the determination processing.

15 Claims, 11 Drawing Sheets

(56) References Cited

U.S. PATENT DOCUMENTS

| | | | |
|---|---|---|---|
| 8,698,438 B2* | 4/2014 | Mori | G03G 15/5004 |
| | | | 318/473 |
| 9,431,940 B2 | 8/2016 | Kameyama | |
| 2012/0013282 A1* | 1/2012 | Introwicz | H02P 6/186 |
| | | | 318/400.06 |
| 2017/0373617 A1* | 12/2017 | Shimizu | H02P 21/18 |
| 2019/0173402 A1 | 6/2019 | Kameyama | |

FOREIGN PATENT DOCUMENTS

| | | |
|---|---|---|
| JP | 2017-028940 A | 2/2017 |
| WO | 2018/025319 A1 | 2/2018 |

* cited by examiner

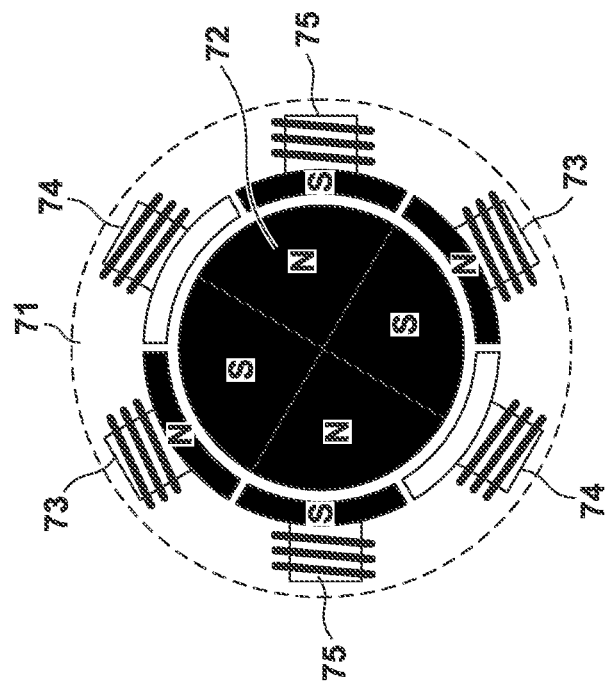
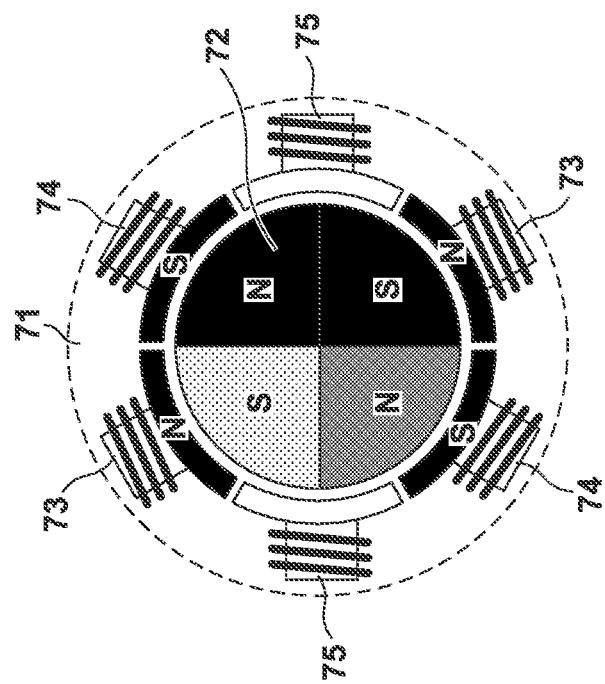

FIG. 7

| TIME | #1 | #2 | #3 | #4 | #5 | #6 | #7 |
|---|---|---|---|---|---|---|---|
| t0 | 0 | 0 | 0 | 0 | 0 | 0 | 0 |
| t1 | 12 | 8 | 7 | 7 | 3 | 3 | 2 |
| t2 | 24 | 16 | 15 | 13 | 7 | 6 | 4 |
| t3 | 36 | 24 | 22 | 20 | 11 | 9 | 6 |
| t4 | 47 | 32 | 29 | 26 | 14 | 11 | 8 |
| t5 | 56 | 38 | 35 | 31 | 17 | 14 | 10 |
| t6 | 64 | 44 | 40 | 36 | 20 | 16 | 12 |
| t7 | 71 | 49 | 44 | 40 | 22 | 17 | 13 |
| t8 | 76 | 52 | 47 | 42 | 23 | 19 | 14 |
| t9 | 79 | 54 | 49 | 44 | 24 | 19 | 14 |
| t10 | 80 | 55 | 50 | 45 | 25 | 20 | 15 |
| t11 | 79 | 54 | 49 | 44 | 24 | 19 | 14 |
| t12 | 76 | 52 | 47 | 42 | 23 | 19 | 14 |
| t13 | 71 | 49 | 44 | 40 | 22 | 17 | 13 |
| t14 | 64 | 44 | 40 | 36 | 20 | 16 | 12 |
| t15 | 56 | 38 | 35 | 31 | 17 | 14 | 10 |
| t16 | 47 | 32 | 29 | 26 | 14 | 11 | 8 |
| t17 | 36 | 24 | 22 | 20 | 11 | 9 | 6 |
| t18 | 24 | 16 | 15 | 13 | 7 | 6 | 4 |
| t19 | 12 | 8 | 7 | 7 | 3 | 3 | 2 |
| t20 | 0 | 0 | 0 | 0 | 0 | 0 | 0 |

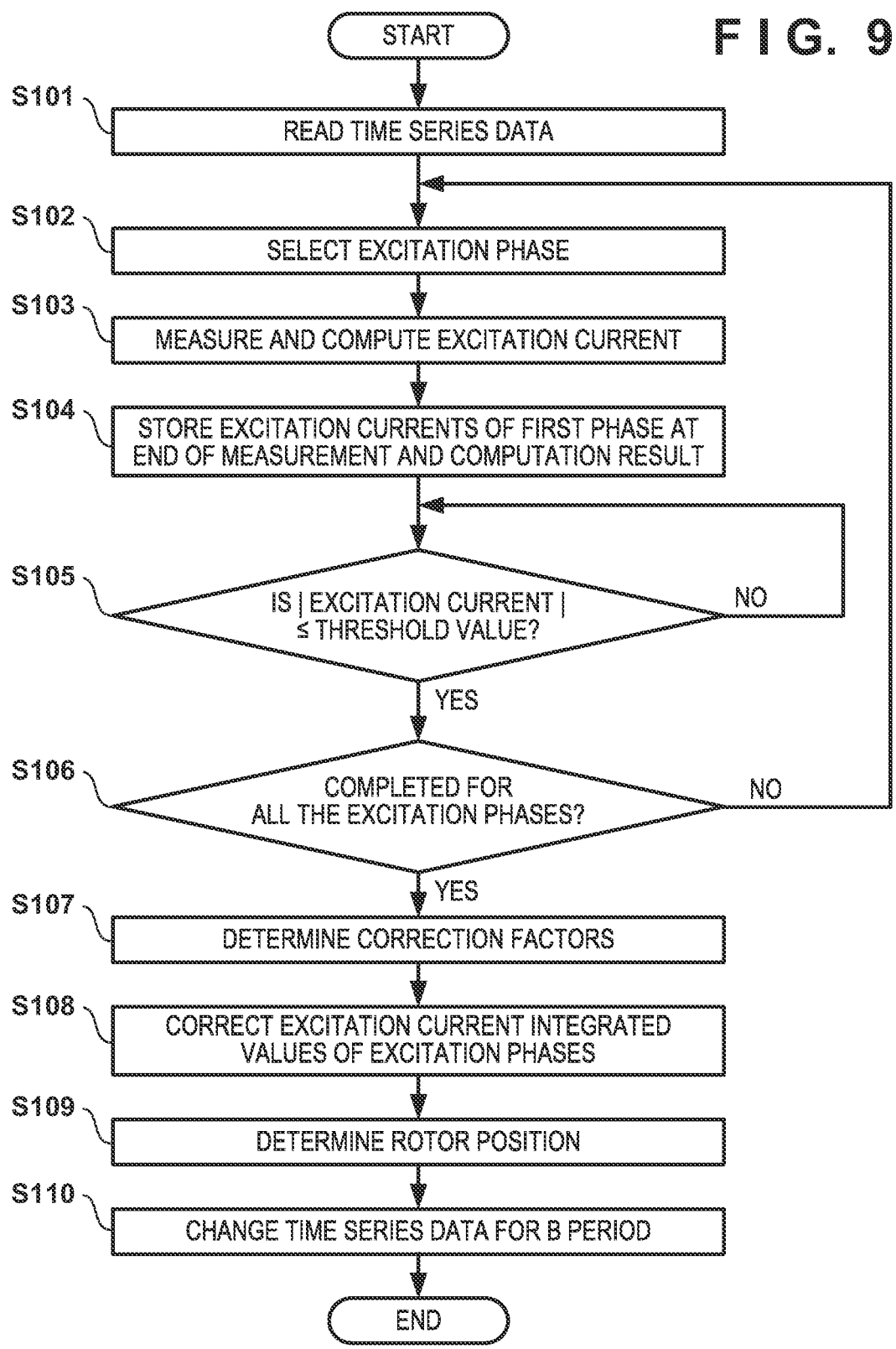

MOTOR CONTROL APPARATUS INCLUDING CURRENT DETECTION UNIT FOR DETECTING COIL CURRENT AND IMAGE FORMING APPARATUS

BACKGROUND OF THE INVENTION

Field of the Invention

The present invention relates to a technique for controlling a motor.

Description of the Related Art

A sensorless DC brushless motor that does not include a sensor for detecting the rotor position is used as a driving source of a rotating member in an image forming apparatus. While the rotor of a sensorless DC brushless motor is rotating at a predetermined speed, the rotational position (rotational phase) of the rotor can be determined based on currents flowing through respective coils of U, V, and W phases. Japanese Patent Laid-Open No. 2003-164197 discloses a configuration in which currents flowing through coils of respective phases are converted to voltages by current sensors, the voltages are amplified by amplifiers, and the currents flowing through the coils of the respective phases are detected by converting the amplified voltages to digital values using AD converters, in order to determine the rotational position of a rotor.

In the configuration disclosed in Japanese Patent Laid-Open No. 2003-164197, errors may occur in the measured current values due to variations of the current sensors, variations in the gain of the amplifiers, and the like. When relative errors are present in the measured current values of the respective phases, an error may occur in the determined rotational position of the rotor. Japanese Patent Laid-Open No. 5-91780 discloses a configuration in which relative errors in the measured current values of respective phases are obtained by causing a DC current at maximum rating to flow in each of the coils of the respective phases, and the current detection units are calibrated using the obtained relative errors, that is, current values measured by the current detection units are corrected.

If the linearity of amplifiers in the current detection units are ideal, errors can be corrected by calibrating the current detection units with the configuration disclosed in Japanese Patent Laid-Open No. 5-91780. However, the linearity of an amplifier is not ideal, in general, and in this case, the correction may not be sufficient. Also, with the configuration disclosed in Japanese Patent Laid-Open No. 5-91780, an operation in which the errors and correction values of the current detection units are obtained by causing a DC current at a maximum rating to flow needs to be performed, and as a result, the down time increases.

SUMMARY OF THE INVENTION

According to an aspect of the present invention, a motor control apparatus includes: a current detection unit configured to detect currents flowing through a plurality of coils of a motor, and includes a first detection unit that detects a current flowing through a first coil of the plurality of coils, and a second detection unit that detects a current flowing through a second coil of the plurality of coils; a determination unit configured to perform determination processing for determining a stopping position of a rotor of the motor based on a detection result of the current detection unit; and a calibration unit configured to calibrate the second detection unit based on a detection result of the first detection unit and a detection result of the second detection unit when a current is flowing in a series connection of the first coil and the second coil in the determination processing.

Further features of the present invention will become apparent from the following description of exemplary embodiments with reference to the attached drawings.

BRIEF DESCRIPTION OF THE DRAWINGS

FIGS. 4A and 4B are diagrams illustrating a configuration of a motor according to one embodiment.

FIG. 7 is a diagram illustrating duty data according to one embodiment.

FIG. 9 is a flowchart of processing for detecting a rotor stopping position including processing for determining a correction factor according to one embodiment.

DESCRIPTION OF THE EMBODIMENTS

Hereinafter, illustrative embodiments of the present invention will be described with reference to the drawings. Note that the following embodiments are illustrative and do not limit the present invention to the contents of the embodiments. Also, in the following diagrams, constituent elements that are not required for describing the embodiments are omitted.

First Embodiment

Figure 1:
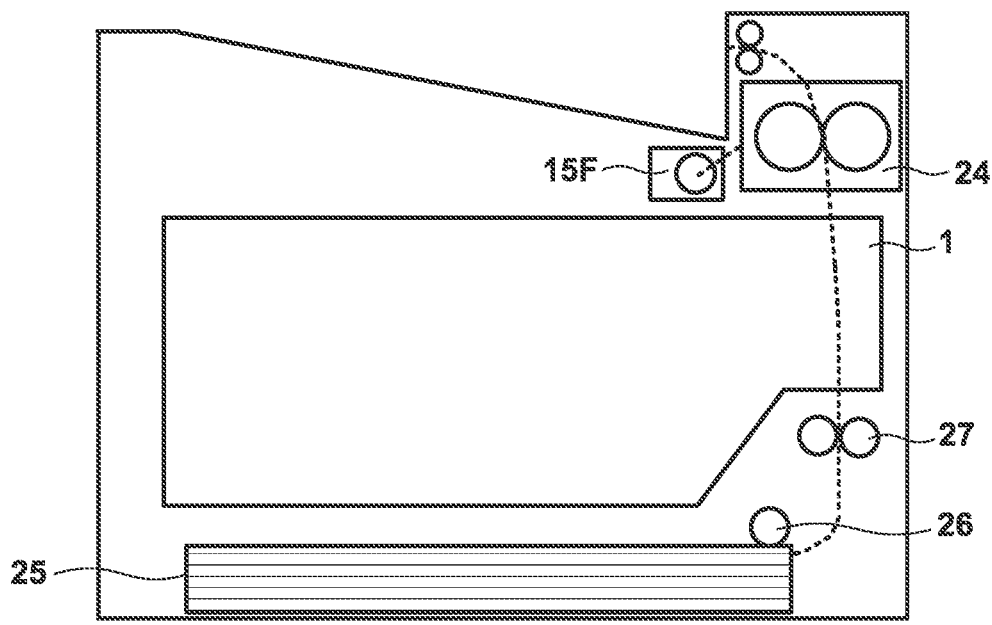
FIG. 1 is a diagram illustrating a configuration of an image forming apparatus according to one embodiment.

FIG. 1 is a diagram illustrating a configuration of an image forming apparatus according to the present embodiment. The image forming apparatus may be one of a printing apparatus, a printer, a copier, a multi-function peripheral, and a facsimile. A sheet stored in a sheet feeding cassette 25 of the image forming apparatus is conveyed along a conveyance path by a sheet feeding roller 26 and a conveyance roller 27. An image forming unit 1 forms yellow, magenta, cyan, and black toner images, and transfers these toner images to a sheet that is conveyed on the conveyance path. The fixing device 24 includes a heating roller and a pressure roller, and fixes the toner images on the sheet by applying heat and pressure to the sheet on which the toner images are transferred. The sheet subjected to processing for fixing the toner images is discharged to the outside of the image forming apparatus. A motor 15F is a driving source for rotating a roller of the fixing device 24.

Figure 2:
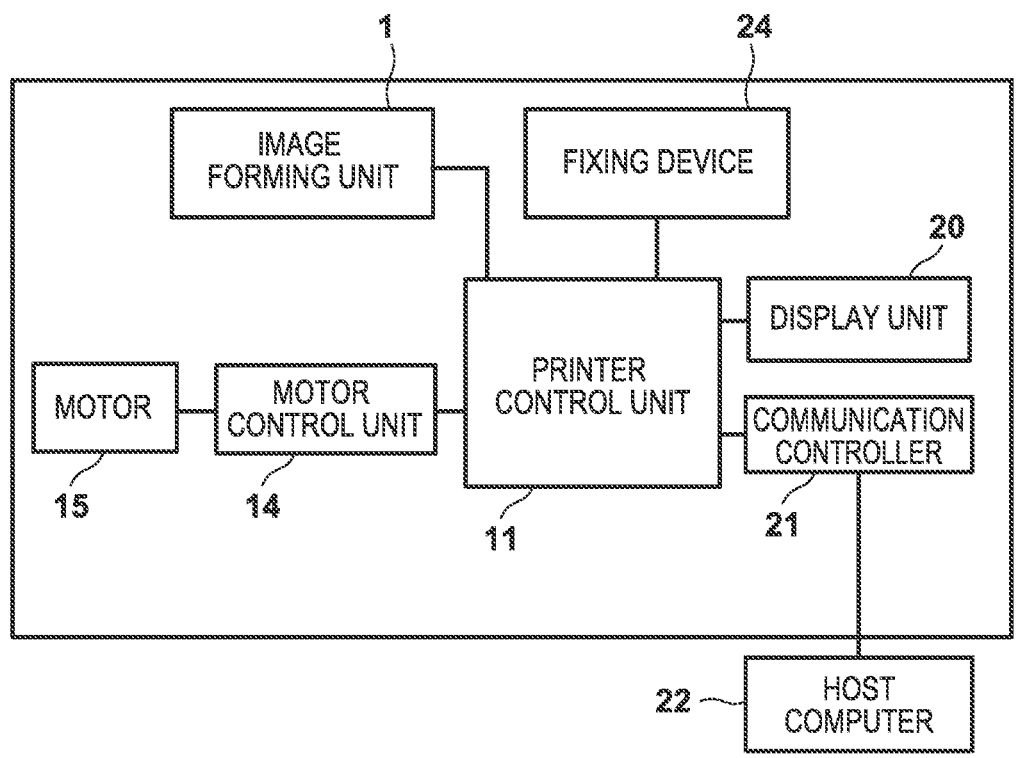
FIG. 2 is a diagram illustrating a control configuration of the image forming apparatus according to one embodiment.

FIG. 2 shows a control configuration of the image forming apparatus. The printer control unit 11, upon receiving image data of an image to be formed from a host computer 22 via a communication controller 21, forms a toner image on a sheet by controlling the image forming unit 1, and fixes the toner image on the sheet by controlling the fixing device 24. Also, here, the printer control unit 11 controls motors 15 including the motor 15F by controlling a motor control unit 14, and performs conveyance control of sheets and the like. Also, the printer control unit 11 display the status of the image forming apparatus in a display unit 20. Note that the printer control unit 11 includes a microcomputer and a memory. The memory stores various types of control programs and data, and the microcomputer controls the units of the image forming apparatus based on the various types of control programs and data stored in the memory.

Figure 3:
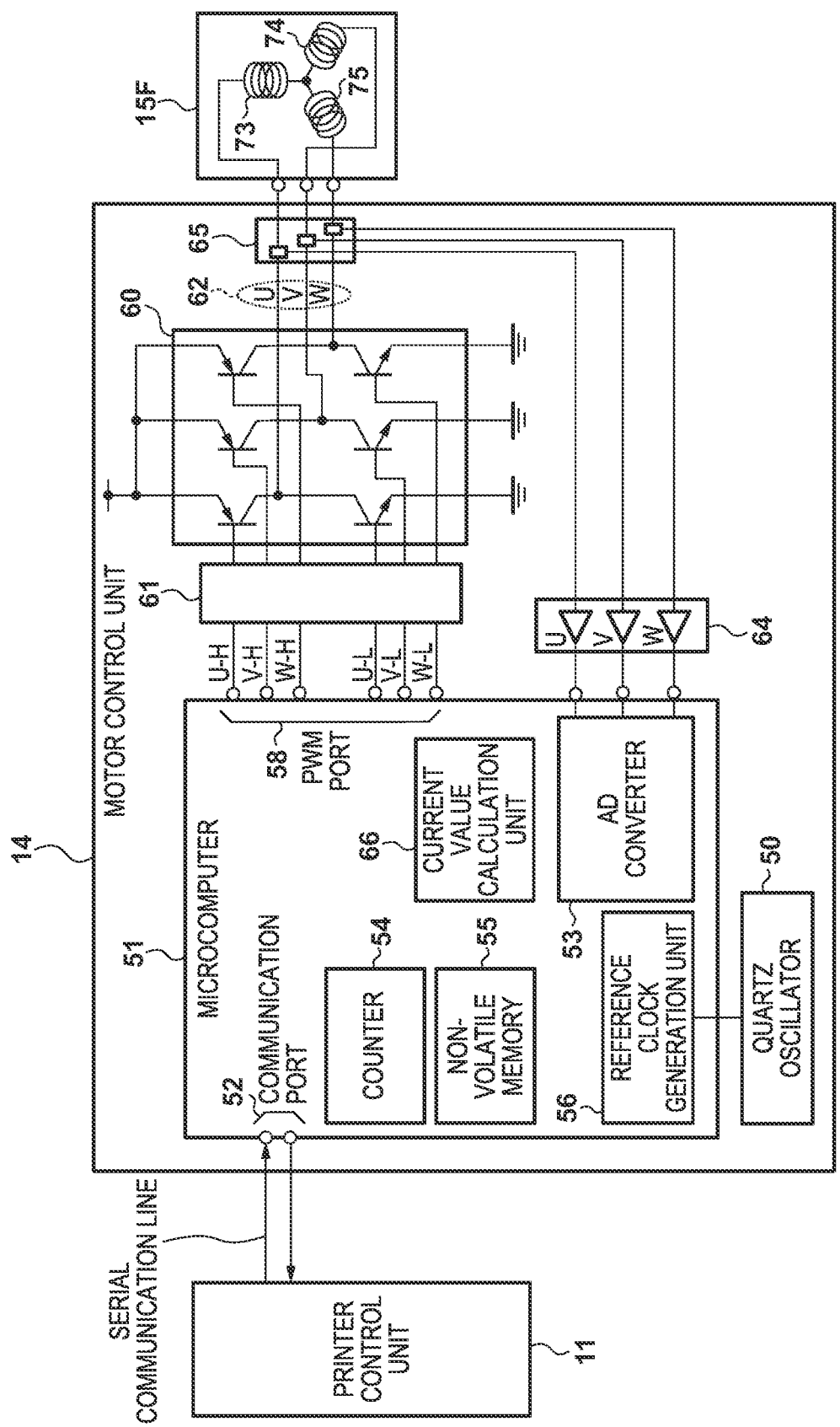
FIG. 3 is a diagram illustrating a configuration of a motor control unit according to one embodiment.

FIG. 3 shows the details of control configuration of the motor 15F. The motor control unit 14 includes a microcomputer 51. The microcomputer 51 communicates with the printer control unit 11 via a communication port 52. Also, a reference clock generation unit 56 of the microcomputer 51 is connected to a quartz oscillator 50, and generates a reference clock based on an output of the quartz oscillator 50. A counter 54 performs a count operation based on the reference clock. The count value is used when the cycle of input pulse is measured, a PWM signal is generated, and the like. The microcomputer 51 includes a nonvolatile memory 55 for storing various data used for controlling the motor 15F and the like. The microcomputer 51 outputs a pulse width modulation signal (PWM signal) from a PWM port 58. In the present embodiment, the microcomputer 51 output six PWM signals in total, namely high-side PWM signals (U-H, V-H, W-H) and low-side PWM signals (U-L, V-L, W-L) for respective three phases (U, V, W) of the motor 15F. Therefore, the PWM port 58 has six terminals U-H, V-H, W-H, U-L, V-L, and W-L.

Terminals of the PWM port 58 are connected to a gate driver 61, and the gate driver 61 controls ON/OFF of switching elements of an inverter 60 for three phases based on the PWM signals. Note that the inverter 60 includes six switching elements, namely three high-side switching elements and three low-side switching elements for respective three phases, and the gate driver 61 controls the six switching elements based on the corresponding PWM signals. A transistor or an FET can be used as the switching element, for example. In the present embodiment, when the PWM signal is at a high level, the corresponding switching element is turned on, and when the PWM signal is at a low level, the corresponding switching element is turned off. Outputs 62 of the inverter 60 are connected to coils 73 (U phase), 74 (V phase), and 75 (W phase). As a result of controlling ON/OFF of the respective switching elements of the inverter 60, excitation currents of the respective coils 73, 74, and 75 can be controlled. As described above, the microcomputer 51, the gate driver 61, and the inverter 60 function as a voltage control unit that controls voltages applied to the plurality of coils 73, 74, and 75.

Current sensors 65 output detection voltages corresponding to excitation currents that flow through the coils 73, 74, and 75, respectively. Amplifier units 64 amplify detection voltages of respective phases, apply an offset voltage, and output the resultant voltages to an analog to digital converter (AD converter) 53. The AD converter 53 converts the amplified detection voltages to digital values. A current value calculation unit 66 determines the excitation currents of the respective phases based on output values (digital values) of the AD converter 53. For example, assume that the current sensor 65 outputs a voltage of 0.01 V per 1 A, the amplification factors (gains) of the amplifier units 64 are 10, and the offset voltage applied by the amplifier units 64 are 1.6 V. If the excitation current flowing through the motor 15F is in a range of −10 A to +10 A, the voltages to be output from the amplifier units 64 are in a range of 0.6 V to 2.6 V. For example, if the AD converter 53 converts voltages of 0 to 3 V to digital values of 0 to 4095, and outputs the converted digital value, the excitation currents of −10 A to +10 A are approximately converted to digital values of 819 to 3549. Note that the excitation currents flowing in a direction from the inverter 60 to the motor 15F are assumed to have positive current values, and the excitation currents flowing in the opposite direction are assumed to have negative current values.

The current value calculation unit 66 obtains an excitation current by reducing an offset value corresponding to the offset voltage from a digital value, and multiplying the resultant digital value by a predetermined conversion factor. In this example, the offset value corresponding to the offset voltage (1.6 V) is about 2184 (1.6×4095/3). Also, the conversion factor is about 0.000733 (3/4095). Hereinafter, this conversion factor, which can be obtained theoretically, is referred to as a reference factor. The reference factor is stored in the nonvolatile memory 55 in advance. Note that the offset value corresponds to a digital value when there is no excitation current, and this offset value is stored in the nonvolatile memory 55, and is read out therefrom when used. As described above, the current sensors 65, the amplifier units 64, the AD converter 53, and the current value calculation unit 66 constitute a current detection unit. Also, hereinafter, the excitation current detected (measured) by the current detection unit is referred to as a measured current value.

FIGS. 4A and 4B are diagrams illustrating a configuration of the motor 15F. The motor 15F includes a stator 71 having six slots and a rotor 72 having four poles. The stator 71 includes the coils of respective phases 73, 74, and 75. The rotor 72 is constituted by permanent magnets, and includes two set of N and S poles. The stopping position of the rotor 72 is determined depending on an excitation phase. Note that the excitation phase is indicated by a series of two coils of the plurality of coils 73, 74, and 75. That is, there are six excitation phases U-V, U-W, V-U, V-W, W-U, and W-V. Here, the excitation in the U-V phase means that an excitation current is caused to flow from the U-phase coil 73 to the V-phase coil 74 with respect to the series connection of the U-phase coil 73 and the V-phase coil 74. For example, when the U-V phase is excited, the rotor 72 stops at the rotational position shown in FIG. 4A. Note that, here, the U phase induces an N pole, and the V phase induces an S pole. Then, when the U-W phase is excited, the rotor 72 stops at a rotational position shown in FIG. 4B.

When the driving of the motor 15F is stopped, and the excitation current is reduced to 0, force to hold the rotor 72 is no longer exerted on the rotor 72, and if an external rotative force is applied to the rotor 72, the rotor 72 rotates.

Therefore, when the fixing device 24 is attached to or removed from the image forming apparatus, or when a sheet caught in the fixing device 24 due to jamming is removed, the rotor 72 may rotate. At this time, the motor control unit 14 cannot determine the stopping position of the rotor 72. Also, immediately after the power supply to the image forming apparatus is turned on, the motor control unit 14 cannot determine the stopping position of the rotor 72. Therefore, when the rotation of the motor 15F is started, first, the motor control unit 14 needs to perform processing for detecting the stopping position of the rotor 72.

Here, in general, a coil such as the coil 73, 74, or 75 has a configuration in which a copper wire is wound around a core that is formed by stacking electrical steel sheets. Also, the magnetic permeability of an electrical steel sheet decreases when an external magnetic field is present. The inductance of a coil is proportional to the magnetic permeability of a core, and therefore when the magnetic permeability of the core decreases, the inductance of the coil also decreases. For example, because the U-phase coil 73 in FIG. 4A opposes only an S pole of the rotor 72, the degree of reduction in inductance of the U-phase coil 73 is larger than that of the W-phase coil 75 that opposes both an S pole and an N pole of the rotor 72. Also, the amount of change in inductance differs depending on whether or not the direction of a magnetic field generated by an excitation current is the same as the direction of an external magnetic field. Specifically, in a state in FIG. 4A, when an excitation current is caused to flow such that the direction of the magnetic field generated by the U-phase coil 73 is the same as the magnetic field generated by the opposing S pole of the rotor 72, that is, the U phase is an N pole, the amount of reduction in inductance increases relative to a case where the excitation current is caused to flow in a direction such that the U phase is an S pole. As described above, the detected inductance differs depending on the stopping position of the rotor 72 and the excitation phase. Also, the core loss of the coil changes when the inductance changes, and therefore the resistance component of the coil also changes.

Figures 5A, 5B:
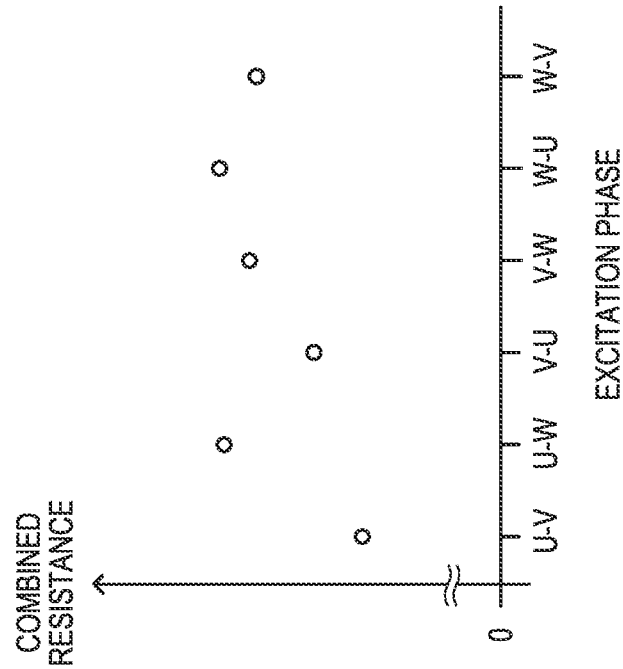
FIG. 5A is a diagram illustrating a relationship between an excitation phase and a combined inductance according to one embodiment.
FIG. 5B is a diagram illustrating a relationship between an excitation phase and a combined resistance according to one embodiment.

FIG. 5A shows an example of the combined inductance at each excitation phase when the rotor 72 stops, and FIG. 5B shows an example of the combined resistance. Note that FIGS. 5A and 5B show the combined inductance and the combined resistance when the rotor 72 is at a position at which the rotor 72 stops when the U-V phase is excited. Hereinafter, the position at which the rotor 72 stops when the X-Y phase is excited is referred to as a "position at the X-Y phase". Since the rotor 72 stops at the position at the U-V phase, the combined inductance and the combined resistance when the U-V phase is excited are smaller than the combined inductances and the combined resistances when the other phases are excited. Therefore, if the relative magnitudes of the impedances at the respective excitation phases are known, the position of the rotor 72 can be determined.

Figure 6A:
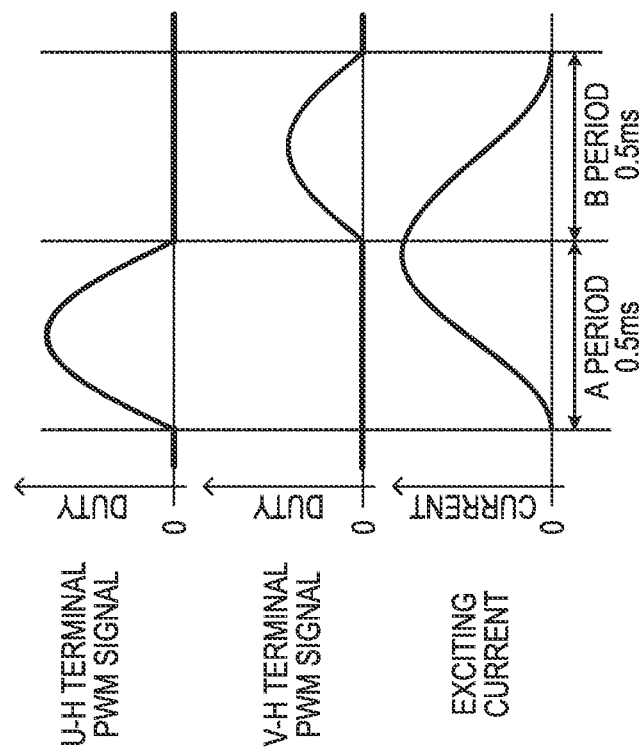
FIG. 6A is a diagram illustrating a change in duty over time of a PWM signal applied to a coil and an excitation current according to one embodiment.

In the present embodiment, as described in the following, the excitation phases are sequentially excited, relative magnitudes of the impedances at the respective excitation phases are determined from the excitation currents that flow when the respective excitation phases are excited, and the rotor stopping position is detected from the determined result. First, when the U-V phase is excited, PWM signals whose duty changes over time, as shown in FIG. 6A, are output from the U-H terminal and the V-H terminal of the PWM port 58. Specifically, in an A period (first period), the duty of the PWM signal output from the U-H terminal is changed sinusoidally. Note that the half cycle of this sine wave corresponds to the length of the A period, and the maximum value of the amplitude is 80%, for example. Note that, in the A period, the V-L terminal is kept at a high level (duty is 100%), and one end of the V-phase coil is connected to a node at a predetermined potential (ground). Note that the other terminals are kept at a low level (duty is 0%). In a B period (second period) following the A period, the duty of the PWM signal output from the V-H terminal is changed sinusoidally. The half cycle of this sine wave is also the length of the B period, and the maximum value of the amplitude is 50%, for example. Note that, in the B period, the U-L terminal is kept at a high level (duty is 100%), and one end of the U-phase coil is connected to a node at a predetermined potential (ground). Note that the other terminals are kept at a low level (duty is 0%). The durations of the A period and the B period are determined based on a required detection accuracy, with the period during which the rotor 72 will not start rotating being the upper limit. In this example, the durations are 0.5 ms. Also, the maximum value of the duty in the A period is determined such that a required detection accuracy can be obtained with the excitation current flowing in the A period. Also, the maximum value of the duty in the B period is set such that the integrated value, over time, of a voltage generated in the inductance component of the coil in the A period and the B period is approximately zero. That is, the maximum value of the duty in the B period is determined based on the voltage applied to the coil in the A period.

Figure 6B:
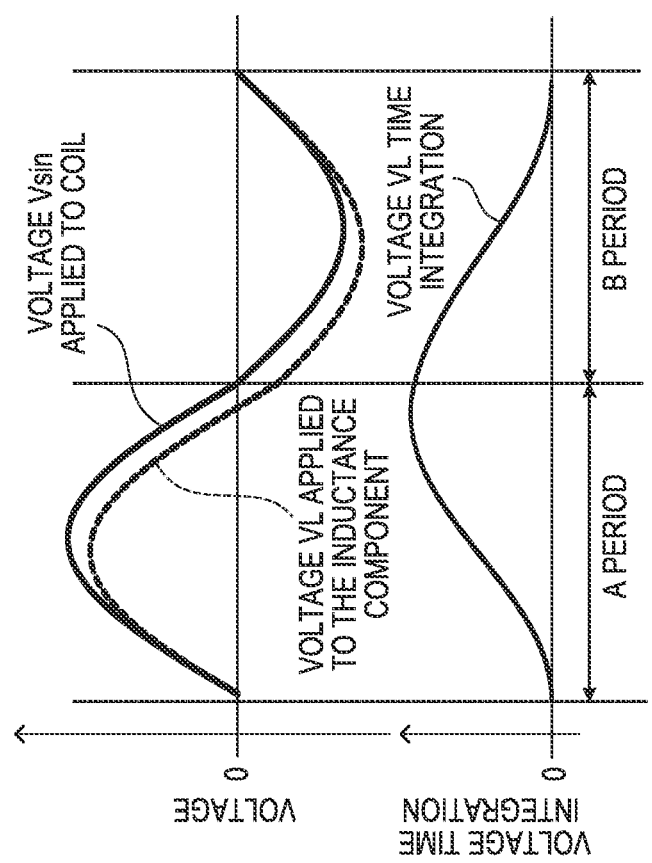
FIG. 6B is a diagram illustrating a voltage applied to an inductance component and a waveform obtained by integrating the voltage according to one embodiment.

FIG. 6B shows a voltage Vsin applied to the coil, a voltage VL applied to the inductance component of the coil, and a waveform obtained by integrating the waveform of the voltage VL over time when the PWM signal is changed sinusoidally, as shown in FIG. 6A. The voltage VL changes from the voltage Vsin due to a voltage drop caused by the resistance of the coil and a reverse voltage. The waveform obtained by integrating the waveform of the voltage VL over time increases while the amplitude of the voltage VL is positive, and decreases after the voltage VL becomes negative. Also, the maximum value of the duty in the B period is set such that the absolute value of the integrated value at the end of the B period is less than or equal to a predetermined value, that is, approximately zero, for example.

As a result of the setting being configured in this way, the excitation current smoothly decreases during the B period, and the excitation current is approximately zero at the end of the B period, as shown in FIG. 6A. If a measurement in which a series of next two coils is the excitation phase is started in a state in which an excitation current is flowing, the current value in the measurement is affected. Therefore, in order to accurately detect the rotor stopping position, the measurement for the next excitation phase needs to be started after the excitation current in the previous measurement becomes substantially small. In the present embodiment, the excitation current is approximately zero at the end of the B period, and as a result, the rotor stopping position can be accurately detected, and a wait time until the measurement for a next excitation phase is started can be reduced.

In the present embodiment, the duty data indicating the relationship between the duty and the time in order to change the duty sinusoidally is created and stored in the nonvolatile memory 55 in advance. FIG. 7 shows an example of the duty data. The duty data in FIG. 7 indicates seven time series data of duty denoted by #1 to #7. Since the A period and the B period are 0.5 ms, the microcomputer 51 switches the duty every 25 μs. As shown in FIG. 7, the maximum value of the duty in the time series data #1 is 80%, and the maximum value of the duty in the time series data #3 is 50%.

Therefore, the time series data #1 is used in the A period, and the time series data #3 is used in the B period. Note that, which pieces of the time series data #1 to #7 are used in the A period and the B period are determined according to typical parameters of the motor 15F and this information is stores in the nonvolatile memory 55, in advance.

Figure 8A:
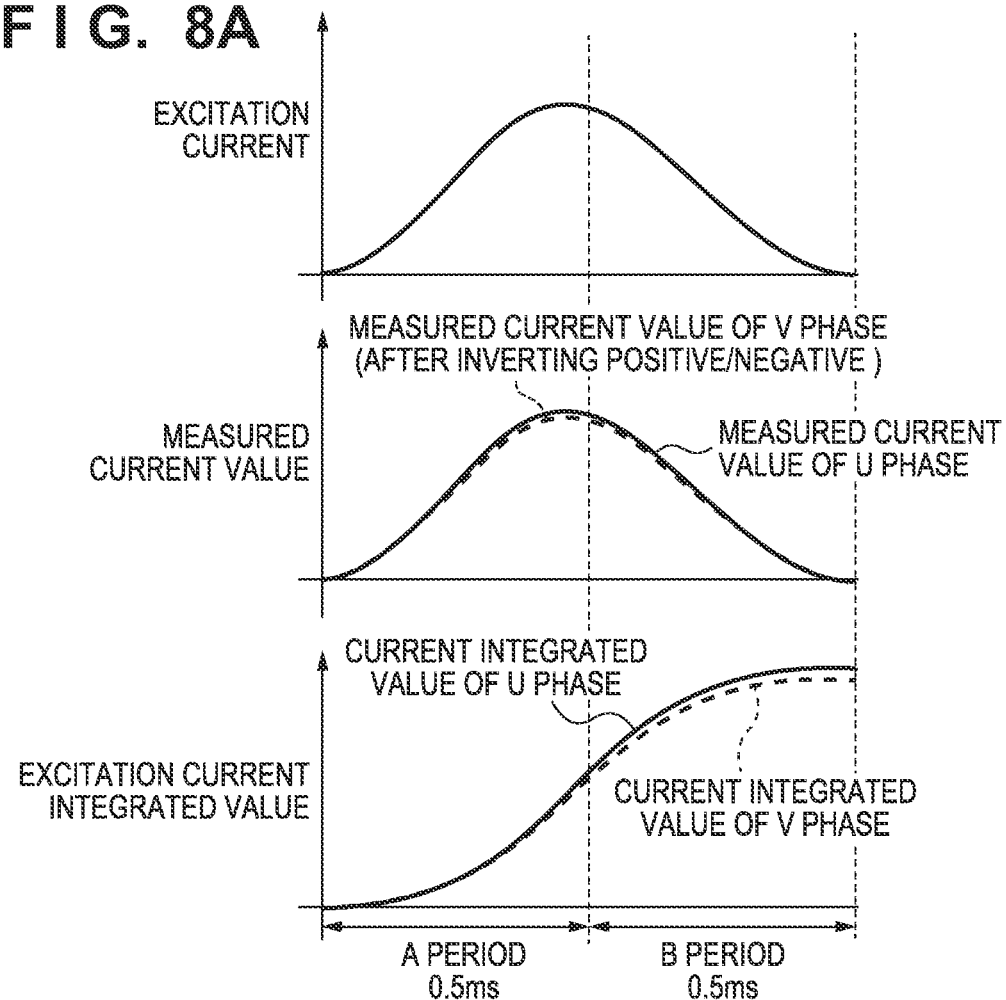
FIGS. 8A and 8B are diagrams illustrating an excitation current, a measured current value, and an integrated value of the excitation current according to one embodiment.
Figure 8B:
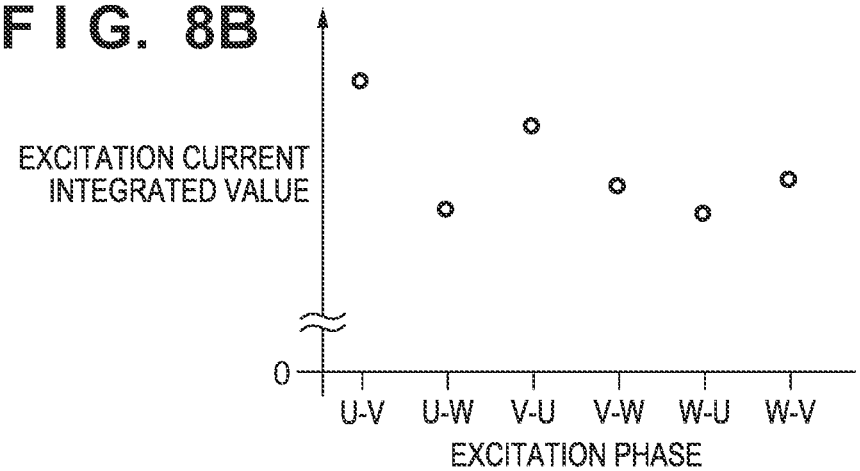

The microcomputer 51 detects the excitation current (measured current value) every predetermined period, 25 μs, for example, in the A period and the B period, and performs processing for integrating the detected excitation current over the A period and the B period. In the following description, the value obtained by integrating the measured current value is referred to as an excitation current integrated value. The microcomputer 51 can determine the stopping position of the rotor by, for the respective excitation phases, applying voltages as described in FIG. 6A, and obtaining and comparing the excitation current integrated values. For example, FIG. 8B shows the relationship between the six excitation phases and the excitation current integrated values obtained by exciting the corresponding excitation phases. In FIG. 8B, the excitation current integrated value when the U-V phase is excited is largest, that is, the impedance when the U-V phase is excited is smallest. Accordingly, the rotor 72 can be determined to be at the position of the U-V phase. This is because, if the rotor 72 is stopping at the position of the U-V phase, the impedance when the U-V phase is excited is smallest, as described above.

Here, in the present embodiment, the current sensors 65 are separate sensors respectively dedicated to the U, V, and W phases. Normally, the current-to-voltage conversion characteristics of the current sensors 65 for the respective phases vary. Also, the amplifier units 64 are respectively dedicated to the U, V, and W phases. Normally, the amplification factors of the amplifiers for the respective phases vary. Therefore, the detection characteristics of the current detection units for the respective phases (degree of deviations of measured current values from corresponding actual excitation current values) differ to each other, and as a result, the measured current values of the respective phases include relative errors.

Accordingly, in the present embodiment, the processing for detecting the stopping position of the rotor includes processing for calibrating the current detection units for the respective phases, that is, processing for correcting the characteristics of the current detection units for the respective phases. Note that, in the present embodiment, the U phase is used as the reference phase, and the correction factors for the V phase and the W phase are obtained. The correction factor for the V phase is a factor for obtaining a conversion factor that is used when the current detection unit for the V phase converts a digital value to a current value. Specifically, the conversion factor that is used when the current detection unit for the V phase converts a digital value to a current value can be obtained by multiplying the reference factor by the correction factor for the V phase. The same applies to the W phase. Note that, in the present embodiment, the current detection unit for the U phase uses the reference factor as the conversion factor.

In the following description, when an X-Y phase is excited, an X phase is referred to as a first phase, and a Y phase is referred to as a second phase. Also, in the present embodiment, the X-Y phase is excited, and the processing for integrating a measured current value for the X phase and the processing for integrating a measured current value for the Y phase are performed. With respect to the Y phase, the integration processing is performed after inverting the sign (positive/negative) of the measured current value. Also, in the following description, the excitation current integrated value of the first phase in the excitation phase may be simply referred to as "current integration value of the excitation phase". FIG. 8A shows an example of the excitation current when the U-V phase is excited, the measured current values of the U phase and the V phase, and the excitation current integrated values of the U phase and the V phase. Note that the reason why the measured current values and the excitation current integrated values are different between the U phase and the V phase is because the detection characteristics of the current detection units of the U phase and the V phase differ, as described above.

FIG. 9 is a flowchart of the processing for detecting the rotor stopping position including the processing for obtaining a correction factor that is executed by the motor control unit 14. Note that, in the following description, the current detection units for the respective phases obtain the measured current values using the reference factor. In step S101, the motor control unit 14 reads out the time series data of duty to be used in the A period and the B period from the nonvolatile memory 55. In step S102, the motor control unit 14 selects the excitation phase with respect to which the measurement is performed. In step S103, the motor control unit 14 outputs PWM signals to the selected excitation phase, as described in FIG. 6A, and obtains an excitation current integrated value by detecting excitation currents at predetermined timings and performing computation on the detected currents. Note that, in the present embodiment, if the excitation phase is one of the U-V phase, the U-W phase, the V-U phase, and the W-U phase, the excitation current integrated values are obtained for the first phase and the second phase, respectively. Note that, as described above, with respect to the second phase, the excitation current integrated value is obtained after inverting the positive/negative of the excitation currents. Also, if the excitation phase is one of the W-V phase and the V-W phase, the excitation current integrated value is obtained with respect to the first phase. When the B period has ended, in step S104, the motor control unit 14 stores the excitation currents at the end of the B period and computation results, that is, the excitation current integrated values to the nonvolatile memory 55. Then, in step S105, the motor control unit 14 waits until the absolute values of the excitation currents have decreased below a predetermined threshold value. Upon the absolute values of the excitation currents having decreased below the predetermined threshold value, in step S106, the motor control unit 14 determines whether or not the measurement with respect to all the excitation phases is completed, and if not, returns the processing to step S102, and starts the detection processing with respect to the next excitation phase.

On the other hand, if the measurement with respect to all the excitation phases is completed, in step S107, the motor control unit 14 obtains the correction factors for the V phase and the W phase. Specifically, the motor control unit 14 obtains a first correction factor for the V phase based on the excitation current integrated values of the U phase and the V phase that have been acquired when the U-V phase was excited. For example, assume that the excitation current integrated value of the V phase when the U-V phase is excited is larger than the excitation current integrated value of the U phase by 5%. In this case, the characteristic of the current detection unit for the V phase can be matched with the characteristic of the current detection unit for the U phase by using a conversion factor that is 0.95 times the reference factor, when converting digital values output from the AD converter 53 to measured current values with respect to the V phase. That is, in this case, the first correction factor is 0.95. The motor control unit 14 obtains a second correction factor of the V phase based on the excitation current integrated values of the U phase and the V phase acquired when the V-U phase is excited. Note that the second correction factor can be obtained similarly to the first correction factor. Also, the motor control unit 14 obtains the correction factor to be used by the current detection unit for the V phase by averaging the first correction factor for the V phase and the second correction factor for the V phase. The same applies to the W phase. Next, in step S108, the motor control unit 14 corrects the excitation current integrated values of the respective excitation phases obtained in step S104 (calculated using the reference factor) using the correction factors obtained in step S107, and obtains the corrected excitation current integrated values. Specifically, if the first phase is the U phase, the correction factor is 1, and correction is practically not performed. On the other hand, if the excitation phase is the V phase or the W phase, corrected excitation current integrated values are obtained that have been corrected using the correction factors obtained in step S107. Then, in step S109, the motor control unit 14 determines the stopping position of the rotor 72 based on the corrected excitation current integrated values of the respective excitation phases.

Finally, in step S110, the motor control unit 14 changes the number of the time series data to be used in the B period. Therefore, in step S104, the motor control unit 14 obtains the average value of the excitation currents with respect to the first phases of the respective excitation phases at the end of the B period that are stored in the nonvolatile memory 55. Note that if the first phase is the W phase or the V phase, values obtained by correcting the excitation currents stored in the nonvolatile memory 55 using the corresponding correction factor are used. If the obtained average value is a positive value (current flows in a forward direction with respect to the excitation phase), and exceeds a positive first threshold value, the motor control unit 14 changes the time series data in the B period such that the maximum value of duty increases. In this example, since the time series data #3 is used, if the obtained average value is a positive value and exceeds the positive first threshold value, the motor control unit 14 changes the time series data to be used in the B period to the time series data #2, for example. On the other hand, if the obtained average value is a negative value (current flows in a reverse direction with respect to the excitation phase) and exceeds a negative second threshold value, the motor control unit 14 changes the time series data in the B period such that the maximum value of duty decreases. In this example, since the time series data #3 is used, if the obtained average value is a negative value and exceeds the negative second threshold value, the motor control unit 14 changes the time series data to be used in the B period to the time series data #4, for example. As a result of changing the time series data to be used in the B period according to the detection result of the excitation current at the end of the B period, dynamic control is realized such that the excitation current at the end of the B period decreases. Therefore, the wait time in step S105 can be reduced, and the time required to detect the rotor stopping position can be reduced.

Note that, when the position of the rotor 72 is determined, while the rotor 72 is rotating, using current values measured by the current detection units for the respective phases, the correction factors obtained in step S107 are used with respect to the W phase and the V phase.

As described above, when the stopping position of the rotor is detected, the correction factors to be used for other phases are obtained in order to correct the relative variations in the detection characteristics of the current detection units for the other phases relative to the reference phase. Then, the correction factors are used when the rotor stopping position is detected and when the rotational position (rotational phase) of the rotor 72 is detected while the rotor 72 is rotating. According to this configuration, the accuracy of detecting the position of the rotor can be increased. Also, in the present embodiment, the current detection units for the respective phases are calibrated in the processing for detecting the stopping position of the rotor, and as a result, the down time of the image forming apparatus can be reduced relative to the configuration in which the current detection units are calibrated separately.

Note that, if the rotor stopping position is again detected after the rotating rotor 72 stops, the already obtained correction factors can be used. In this case, in steps S103 and S104 in FIG. 9, the excitation current integrated values in the first phase need only be obtained for all of the excitation phases, and the processing in step S107 is skipped. Also, if the rotor stopping position is again detected after the rotating rotor 72 stops, the already obtained correction factors may be deleted, and new correction factors may be obtained through the processing in FIG. 9.

Also, in the flowchart in FIG. 9, the measured current values are obtained using the reference factor with respect to all of the phases, but if the correction factors are already obtained, the measured current values may be obtained using conversion factors obtained by multiplying the reference factor by the correction factors. In this case, the already obtained correction factors are changed such that the difference in the excitation current integrated value between the first phase and the second phase decreases, to be 0, for example.

Note that, in the embodiment described above, the first correction factor for the V phase is obtained by exciting the U-V phase, the second correction factor is obtained by exciting the V-U phase, and the average value of the first correction factor and the second correction factor is used as the correction factor for the V phase. However, the first correction factor obtained by exciting the U-V phase may be used as the correction factor for the V phase. In this case, the excitation current integrated value of the U phase need not to be obtained when the V-U phase is excited. Similarly, the second correction factor obtained by exciting the V-U phase may be used as the correction factor for the V phase. In this case, the excitation current integrated value of the V phase need not be obtained when the U-V phase is excited. The same applies to the W phase. Also, in the embodiment described above, the U phase is the reference phase, and therefore the correction factor for the U phase is kept at 1. However, instead of providing a reference phase whose correction factor is 1, that is, the reference phase with respect to which the characteristic of a current detection unit therefor is not corrected, the correction factors with respect to all of the phases may be obtained such that the difference in characteristic between the current detection units decreases.

Furthermore, in the embodiment described above, the correction factors are determined using excitation current integrated values over the A period and the B period. However, the correction factors may be determined using excitation current integrated values over a predetermined period of the A period and the B period. Specifically, the correction factor for the V phase may be calculated based on the excitation current integrated value of the U phase and the excitation current integrated value of the V phase over the same integration period, when the U-V phase is excited. The same applies to the case where the correction factor for the V phase is obtained by exciting the U-V phase and the V-U phase. Also, instead of using the integrated value, the correction factor for the V phase may also be calculated based on a measured current value of the U phase and a measured current value of the V phase that are measured at the same timing. Furthermore, the correction factors may be calculated using digital values output from the AD converter 53, instead of measured current values that are converted using conversion factors (including the reference factor), and the conversion factors to be used by the current detection units for the respective phases may be determined.

Note that, in the above description, the conversion factor is obtained by multiplying the reference factor by the correction factor, and the current value calculation unit 66 obtains the measured current value from the digital value output from the AD converter 53 and the conversion factor. However, it is needless to say that a configuration is also possible in which the digital value output from the AD converter 53 is converted to a current value using the reference factor, and the current value is corrected using the correction factor.

Also, the above-described motor control unit 14 can be implemented as a motor control apparatus. Also, the motor control unit 14 and a portion of the printer control unit 11 that relates to motor control can be implemented as a motor control apparatus. Furthermore, in the present embodiment, the control of the motor 15F that drives the fixing device 24 has been described as an example, but the present invention can also be similarly applied to motors that drive rollers for conveying sheets in the image forming apparatus, for example. Similarly, the present invention can also be similarly applied to a motor that drives a member in the image forming unit 1 of the image forming apparatus.

Second Embodiment

Next, a second embodiment will be described focusing on the differences from the first embodiment. In the present embodiment, the motor 15F is rotated at 2000 rpm or 1000 rpm. Note that, it is assumed that the excitation current when the motor 15F is rotated at 2000 rpm is larger than 1 A, and the excitation current when the motor 15F is rotated at 1000 rpm is smaller than 1 A. In the first embodiment, the reference factor is corrected using one correction value regardless of the rotation frequency of the motor 15F, that is, the magnitude of the excitation current while the motor 15F is rotating. In the present embodiment, the correction factor to be used is different between the case where the rotation frequency of the motor 15F is 2000 rpm and the case where the rotation frequency is 1000 rpm. In the following, the correction factor to be used when the rotation frequency of the motor 15F is 2000 rpm is referred to as a high range correction factor, and the correction factor to be used when the rotation frequency of the motor 15F is 1000 rpm is referred to as a low range correction factor.

Figure 10:
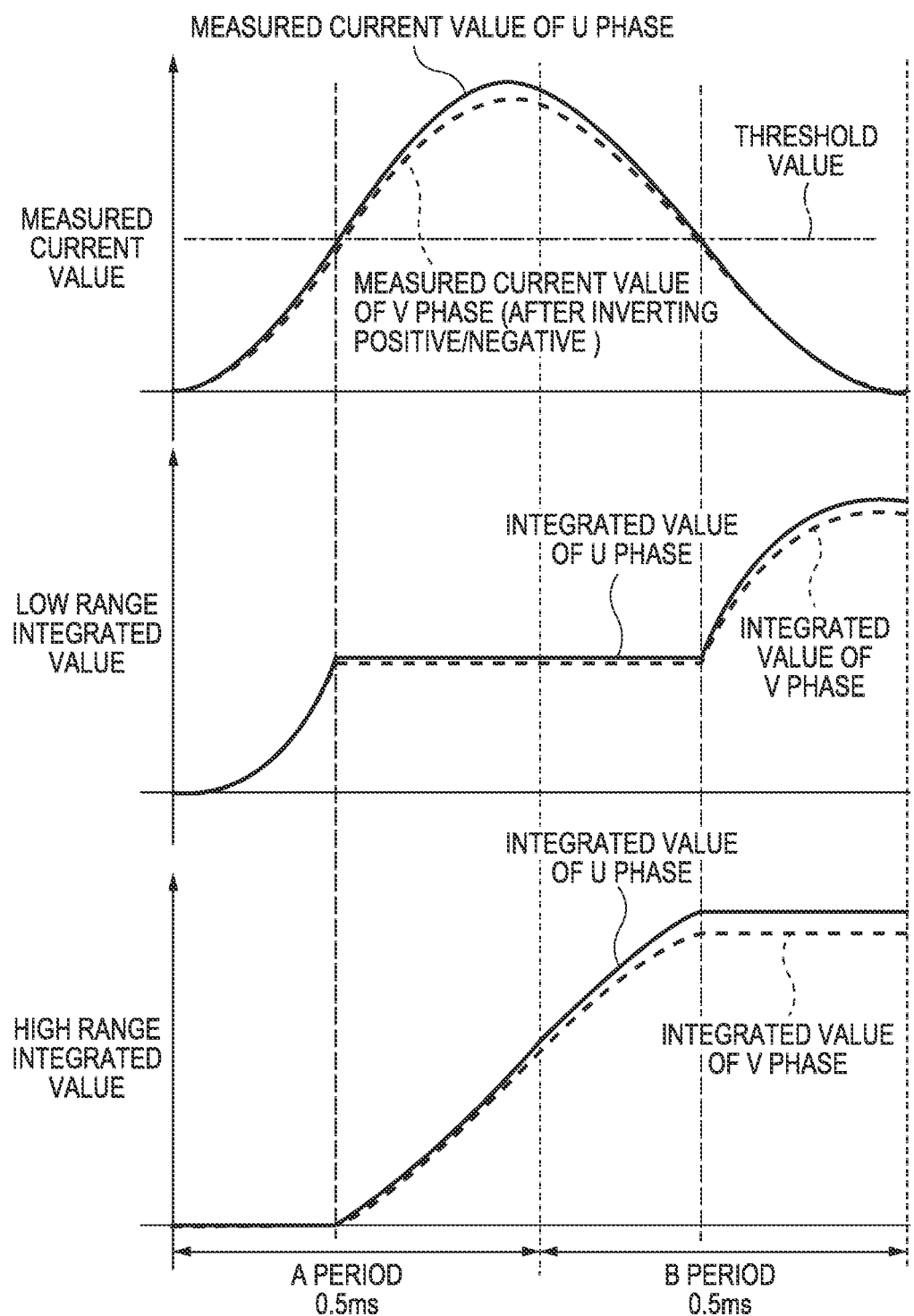
FIG. 10 is a diagram illustrating a measured current value, a low range integrated value, and a high range integrated value according to one embodiment.

In order to obtain the high range correction factor and the low range correction factor, in the present embodiment, a low range integrated value, which is an integrated value in a period when the excitation current obtained using the reference factor is less than a threshold value, and a high range integrated value, which is an integrated value in a period when the excitation current obtained using the reference factor is larger than a threshold value, are obtained, as shown in FIG. 10. Note that the threshold value may be a value between the excitation current value when the rotation frequency of the motor 15F is 2000 rpm and the excitation current value when the rotation frequency of the motor 15F is 1000 rpm, and may be 1 A, for example. The basic flow of the processing for determining the rotational position of the rotor including the processing for calculating the correction factors according to the present embodiment is the same as that of the first embodiment (FIG. 9). In the following, the processing for determining the rotational position of the rotor including the processing for calculating the correction factors according to the present embodiment will be described using the flowchart in FIG. 9.

In the present embodiment as well, in step S103, if the excitation phase is one of the U-V phase, the U-W phase, the V-U phase, and the W-U phase, the excitation current integrated values are obtained for the first phase and the second phase, respectively, and if the excitation phase is other than those phases, the excitation current integrated value of the first phase is obtained. However, in the present embodiment, the low range integrated value and the high range integrated value are separately obtained. Note that, the excitation current integrated value over the A period and the B period can be obtained by adding the low range integrated value and the high range integrated value.

In the present embodiment, the low range correction factor for the V phase is obtained based on the low range integrated values of the U phase and the V phase when the U-V phase is excited and the low range integrated values of the U phase and the V phase when the V-U phase is excited. Also, the high range correction factor for the V phase is obtained based on the high range integrated values of the U phase and the V phase when the U-V phase is excited and the high range integrated values of the U phase and the V phase when the V-U phase is excited. Note that the concept of obtaining the correction factors is similar to that of the first embodiment. Also, the same applies to the W phase.

Also, in the present embodiment, in step S109, the corrected excitation current integrated value of an excitation phase in which the V phase is the first phase can be obtained by the sum of the product of the low range integrated value of the V phase in the excitation phase and the low range correction factor for the V phase and the product of the high range integrated value of the V phase in the excitation phase and the high range correction factor for the V phase. The same applies to the excitation phase in which the W phase is the first phase. Note that, since the correction factor for the U phase is 1, the corrected excitation current integrated value of the excitation phase in which the U phase is the first phase is obtained by adding the low range integrated value of the U phase and the high range integrated value of the U phase, in the excitation phase.

In the present embodiment, when the motor 15F is rotated at 2000 rpm, the excitation currents of the V phase and the W phase are obtained using the high range correction factor, and when the motor 15F is rotated at 1000 rpm, the excitation currents of the V phase and the W phase are obtained using the low range correction factor. As described above, as a result of using a correction factor according to the magnitude of the excitation current, the accuracy of detecting the stopping position of the rotor can be increased.

Note that, in the present embodiment as well, similarly to the first embodiment, the correction factor for the V phase can be obtained by exciting the U-V phase or the V-U phase. Also, the correction factor can be obtained using a digital value output from the AD converter 53 in place of the excitation current.

Also, in the above-described embodiment, two correction factors, namely the low range correction factor and the high range correction factor, are obtained. However, three or more correction factors may be used distinctively from each other according to the digital value output from the AD converter 53 or the measured current value obtained using the reference factor. For example, the digital values output from the AD converter 53 or the measured current values obtained using the reference factor are divided into a plurality of continuous ranges that do not overlap each other. The motor control unit 14 obtains the correction factor to be used in a continuous range by integrating the digital value or the measured current value in the continuous range with respect to each of the first phase and the second phase in an excitation phase.

Third Embodiment

Figure 11:
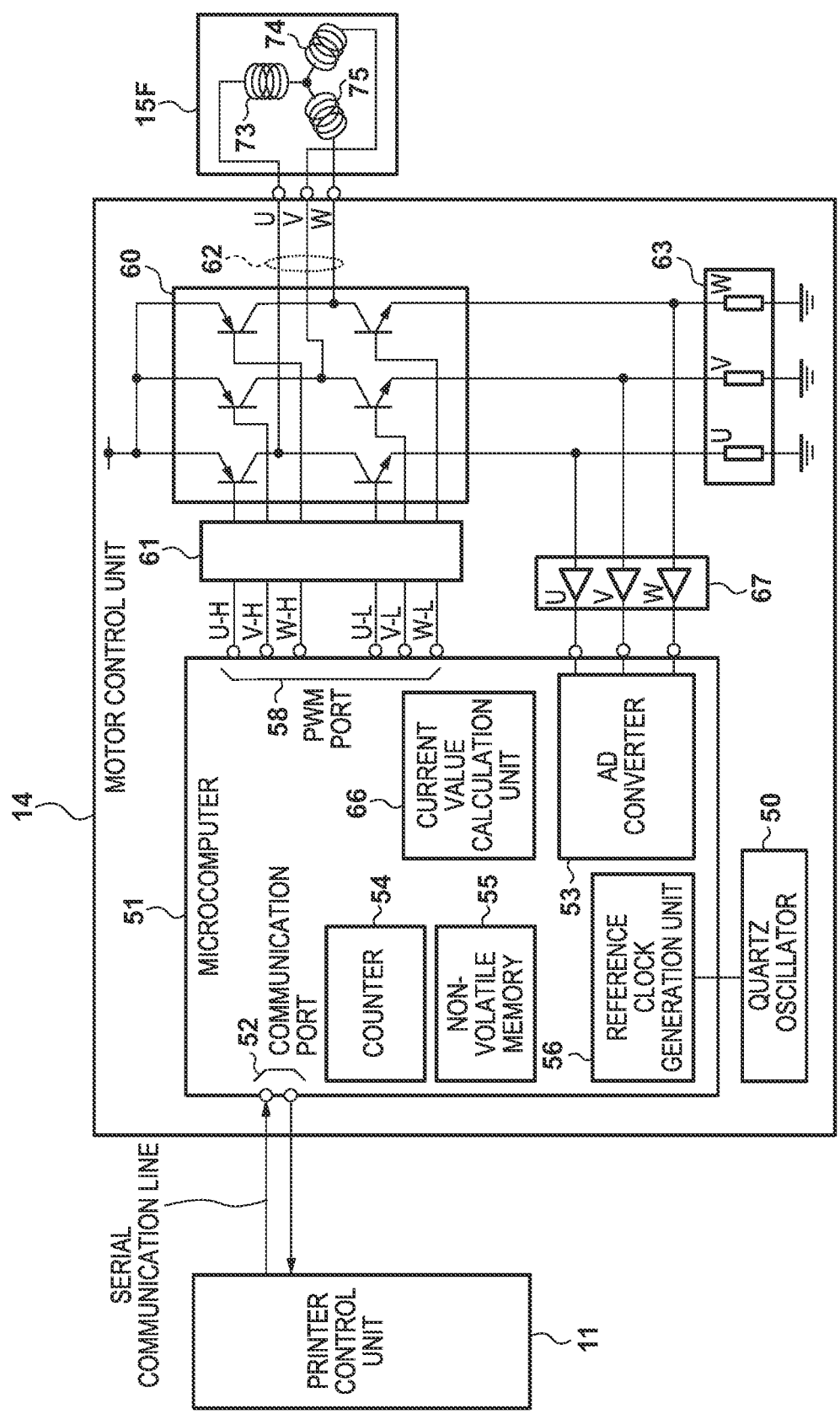
FIG. 11 is a diagram illustrating a configuration of a motor control unit according to one embodiment.

Next, a third embodiment will be described focusing on the differences from the first embodiment. FIG. 11 is a diagram illustrating a configuration of a motor control unit 14 according to the present embodiment. In the present embodiment, the configuration for measuring currents is different from that of the first embodiment. Specifically, the currents flowing in the respective phases are converted to voltages by resistors 63 corresponding to the respective phases. Inverting amplifier units 67 corresponding to the respective phases amplify the voltages of the corresponding resistors 63, add an offset voltage thereto, and outputs the resultant voltages to the AD converter 53.

Figure 12:
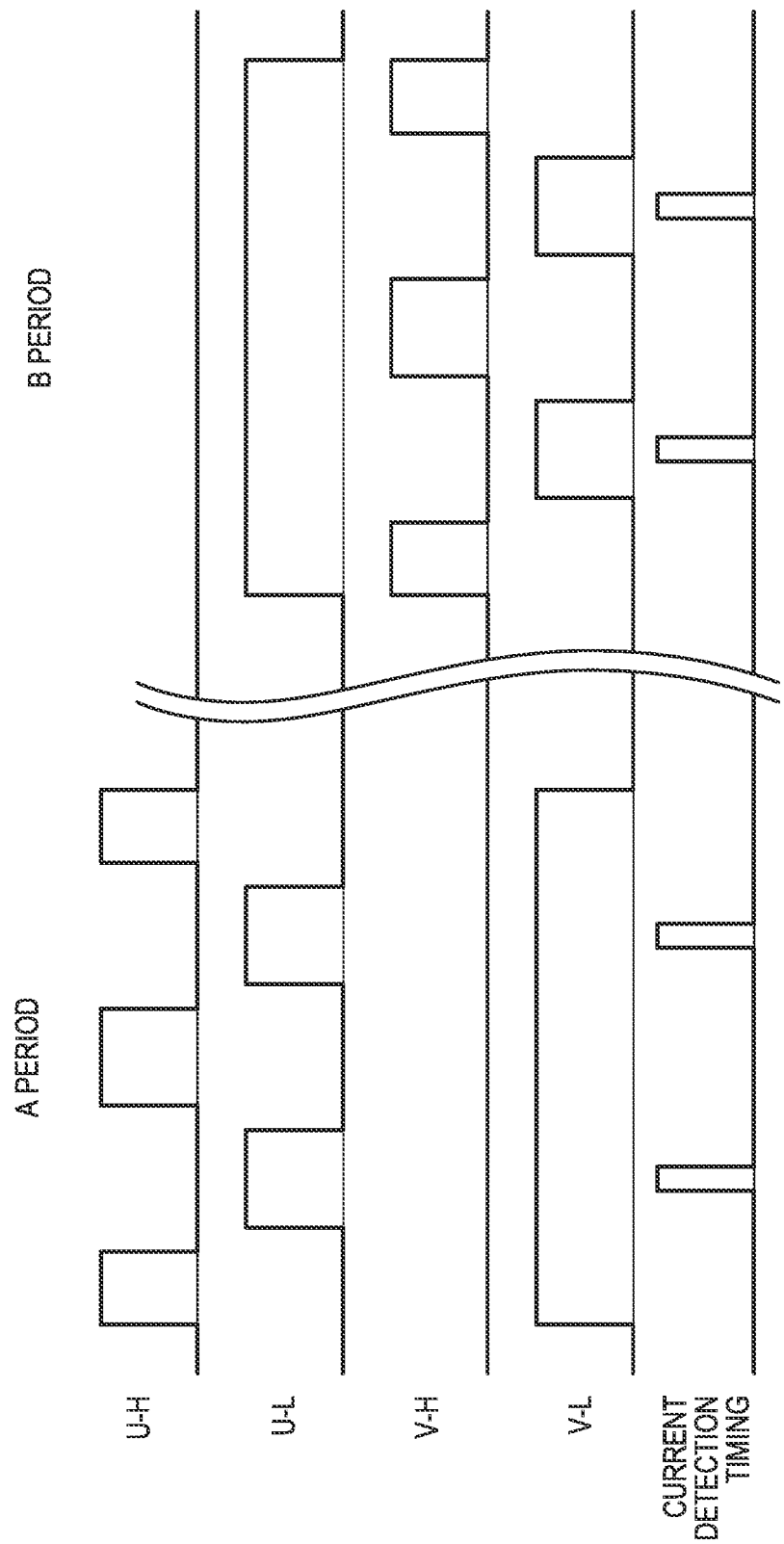
FIG. 12 is a diagram illustrating voltages applied to coils and current detection timings according to one embodiment.

As shown in FIG. 12, in the present embodiment, when the U-V phase is excited, in the A period, the V-H terminal is fixed at a low level, and the V-L terminal is fixed at a high level. On the other hand, when the U-V phase is excited, in the A period, the levels of the U-H terminal and U-L terminal are alternatingly turned to high. Here, if, after the level of the U-H terminal is turned to high and the level of the U-L terminal is turned to low, the level of the U-H terminal is turned to low and the U-L terminal is turned to high, a regenerative current flows through the V phase resistor 63. In the present embodiment, this regenerative current is detected in the A period when the U-V phase is excited. Similarly, in the present embodiment, when the U-V phase is excited, the U-H terminal is fixed at a low level and the U-L terminal is fixed at a high level in the B period. On the other hand, when the U-V phase is excited, the levels of the V-H terminal and the V-L terminal are alternatingly tuned to high in the B period. Here, if, after the level of the V-H terminal is turned to high and the level of the V-L terminal is turned to low, the level of the V-H terminal is turned to low and the level of the V-L terminal is turned to high, a regenerative current flows through the U phase resistor 63. In the present embodiment, this regenerative current is detected in the B period when the U-V phase is excited. FIG. 12 shows detection timings of the regenerative current as well.

Note that the processing for detecting the rotor stopping position and the processing for calculating the correction factors are similar to those of the first embodiment.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-117310, filed on Jun. 20, 2018, which is hereby incorporated by reference herein in its entirety.

What is claimed is:

1. A motor control apparatus comprising:
   a current detection unit configured to detect currents flowing through a plurality of coils of a motor, and includes a first detection unit that detects a current flowing through a first coil of the plurality of coils, and a second detection unit that detects a current flowing through a second coil of the plurality of coils;
   a determination unit configured to perform determination processing for determining a stopping position of a rotor of the motor based on a detection result of the current detection unit; and
   a calibration unit configured to calibrate the second detection unit based on a detection result of the first detection unit and a detection result of the second detection unit when a current is flowing in a series connection of the first coil and the second coil in the determination processing.

2. The motor control apparatus according to claim 1, wherein the calibration unit is further configured to calibrate the second detection unit by obtaining a correction factor for correcting a value to be detected by the second detection unit based on the detection result of the first detection unit and the detection result of the second detection unit.

3. The motor control apparatus according to claim 2,
   wherein the detection result of the first detection unit is an integrated value of a value detected by the first detection unit in a period in which a current flows from the first coil toward the second coil or a current flows from the second coil toward the first coil, and
   the detection result of the second detection unit is an integrated value of a value detected by the second detection unit in the same period as an integration period of the detection result of the first detection unit.

4. The motor control apparatus according to claim 2, wherein the calibration unit is further configured to calibrate the second detection unit by obtaining the correction factor with which a difference between the detection result of the first detection unit and the detection result of the second detection unit decreases.

5. The motor control apparatus according to claim 2,
wherein the detection result of the first detection unit includes a first detection result of the first detection unit when a current flows from the first coil toward the second coil and a second detection result of the first detection unit when a current flows from the second coil toward the first coil, and
the detection result of the second detection unit includes a third detection result of the second detection unit when a current flows from the first coil toward the second coil and a fourth detection result of the second detection unit when a current flows from the second coil toward the first coil.

6. The motor control apparatus according to claim 5,
wherein the first detection result is an integrated value of a value detected by the first detection unit in a period in which the current flows from the first coil toward the second coil,
the third detection result is an integrated value of a value detected by the second detection unit in the same period as an integration period of the first detection result,
the second detection result is an integrated value of a value detected by the first detection unit in a period in which the current flows from the second coil toward the first coil, and
the fourth detection result is an integrated value of a value detected by the second detection unit in the same period as an integration period of the second detection result.

7. The motor control apparatus according to claim 5, wherein the calibration unit is further configured to obtain the correction factor for connecting the value to be detected by the second detection unit based on a first value of the correction factor that is obtained such that the difference between the first detection result and the third detection result decreases and a second value of the correction factor that is obtained such that the difference between the second detection result and the fourth detection result decreases.

8. The motor control apparatus according to claim 7, wherein the calibration unit is further configured to obtain the correction factor for connecting the value to be detected by the second detection unit by averaging the first value and the second value.

9. The motor control apparatus according to claim 2,
wherein the second detection unit is further configured to use a plurality of correction factors according to a value detected by the second detection unit, and
the calibration unit is further configured to calibrate the second detection unit by obtaining the plurality of correction factors based on the detection result of the first detection unit and the detection result of the second detection unit in a period in which a current flows in the series connection of the first coil and the second coil in the determination processing.

10. The motor control apparatus according to claim 9,
wherein the calibration unit obtains a first correction factor of the plurality of correction factors based on a first detection result of the first detection unit and a second detection result of the second detection unit, and obtains a second correction factor of the plurality of correction factors based on a third detection result of the first detection unit and a fourth detection result of the second detection unit,
the first detection result is an integrated value of a value in a first range that is detected by the first detection unit,
the second detection result is an integrated value of a value detected by the second detection unit in the same period as an integration period of the first detection result,
the third detection result is an integrated value of a value, in a second range that does not overlap the first range, that is detected by the first detection unit,
the fourth detection result is an integrated value of a value detected by the second detection unit in the same period as an integration period of the third detection result, and
the second detection unit is further configured to use the first correction factor if a detected value is in the first range, and use the second correction factor if a detected value is in the second range.

11. The motor control apparatus according to claim 2, wherein the determination unit is further configured to determine the stopping position of the rotor by correcting the detection result of the second detection unit based on the correction factor obtained by the calibration unit in the determination processing.

12. The motor control apparatus according to claim 2,
wherein the first detection unit includes a first output unit that outputs a first output value according to the current flowing through the first coil, and a first conversion unit that converts the first output value to a current value using a reference factor, and
the second detection unit includes a second output unit that outputs a second output value according to the current flowing through the second coil, and a second conversion unit that converts the second output value to a current value using the reference factor and the correction factor.

13. The motor control apparatus according to claim 12,
wherein the first output unit includes a first current sensor configured to output a voltage according to the current flowing through the first coil, a first amplifier unit configured to amplify the voltage output from the first current sensor, and a first digital converter configured to convert a voltage output from the first amplifier unit to the first output value,
the first conversion unit is configured to convert the first output value output from the first digital converter to the current value using the reference factor,
the second output unit includes a second current sensor configured to output a voltage according to the current flowing through the second coil, a second amplifier unit configured to amplify the voltage output from the second current sensor, and a second digital converter configured to convert a voltage output from the second amplifier unit to the second output value, and
the second conversion unit is configured to convert the second output value output from the second digital converter to the current value by using the reference factor and the correction factor.

14. The motor control apparatus according to claim 1, wherein the current flowing in the series connection between the first coil and the second coil in the determination processing is an excitation current or a regenerative current.

15. An image forming apparatus comprising:
a rotating member for conveying a sheet along a conveyance path;

an image forming unit configured to form an image on the sheet that is conveyed on the conveyance path;
a motor configured to drive the rotating member or the image forming unit; and
a motor control unit configured to control the motor, wherein the motor control unit includes:
a current detection unit configured to detect currents flowing through a plurality of coils of the motor, and includes a first detection unit that detects a current flowing through a first coil of the plurality of coils, and a second detection unit that detects a current flowing through a second coil of the plurality of coils;
a determination unit configured to perform determination processing for determining a stopping position of a rotor of the motor based on a detection result of the current detection unit; and
a calibration unit configured to calibrate the second detection unit based on a detection result of the first detection unit and a detection result of the second detection unit when a current is flowing in a series connection of the first coil and the second coil in the determination processing.

* * * * *